US012800850B2

(12) United States Patent
Tseng

(10) Patent No.: US 12,800,850 B2
(45) Date of Patent: Nov. 17, 2026

(54) OPTICAL CONNECTOR

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 265 days.

(21) Appl. No.: 18/369,859

(22) Filed: Sep. 19, 2023

(65) Prior Publication Data

US 2024/0255707 A1 Aug. 1, 2024

Related U.S. Application Data

(60) Provisional application No. 63/408,482, filed on Sep. 21, 2022.

(51) Int. Cl.
*G02B 6/38* (2006.01)

(52) U.S. Cl.
CPC .......... *G02B 6/3893* (2013.01); *G02B 6/3885* (2013.01)

(58) Field of Classification Search
CPC ............................ G02B 6/3885; G02B 6/3893
See application file for complete search history.

(56) References Cited

U.S. PATENT DOCUMENTS

| | | | | |
|---|---|---|---|---|
| 11,209,601 | B2 * | 12/2021 | Liu | G02B 6/3893 |
| 2016/0231512 | A1 * | 8/2016 | Seki | G02B 6/3893 |
| 2018/0217339 | A1 * | 8/2018 | Ma | G02B 6/3893 |
| 2019/0361177 | A1 * | 11/2019 | Aoshima | G02B 6/38875 |
| 2021/0141167 | A1 * | 5/2021 | Wong | G02B 6/3825 |
| 2021/0263242 | A1 * | 8/2021 | Lin | G02B 6/3898 |
| 2024/0085640 | A1 * | 3/2024 | Tseng | G02B 6/3881 |

* cited by examiner

*Primary Examiner* — Michael Stahl
(74) *Attorney, Agent, or Firm* — WPAT, PC

(57) ABSTRACT

The present invention provides an optical connector comprising a terminal portion and a connector body. The connector body has a buckle structure for latching with a receptacle and an unbuckle structure for releasing buckle structure from the receptacle. The connector body comprises a first assembly element and a second assembly element. The first assembly element is connected to the terminal portion, and a first channel is formed at a first side of the first assembly element while a first coupling element is arranged at a second side of the first assembly element. The second assembly element is connected to the first coupling element, and a second channel formed on a first side of the second assembly element is communicated with the first channel while a second coupling element is arranged at a second side of the second assembly element and movably connected to the first coupling element.

7 Claims, 3 Drawing Sheets

OPTICAL CONNECTOR

CROSS-REFERENCE TO RELATED APPLICATION

This application claims the benefit under 35 U.S.C. § 119(e) to the U.S. provisional patent application having the Ser. No. 63/408,482 filed on Sep. 21, 2022, the entirety of which is incorporated herein by reference.

FIELD OF INVENTION

The present invention relates to an optical connector, in particular to an optical connector with a movable space that moves forward and backward and a detachable and combinable two-piece connector body structure.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications. With the advancement of communication technology, data centers or computer rooms must use ultra-high-density wiring to meet the needs of use.

In order to meet the aforementioned use requirements, optical connectors with optical fiber conductive media have become the main reason for the increase in data volume and transmission rate of data centers. However, in certain usage scenarios, such as transmission towers or relay stations, in addition to using optical fiber to transmit information, wires for transmitting electric power are also needed to supply power to the receiver and transmitter. Based on this demand, there are optical connectors that can transmit optical signals and electric signal at the same time on the market.

In order to increase the number of optical connectors in a limited space, conventional optical connectors have a connector body with a short size design. Although such a design can increase the number of optical connectors set in a limited space, due to the design of the locking and unlocking mechanism, the optical connectors cannot be stacked up and down or left and right, so that the density of the optical connectors cannot be effectively improved.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector, which has an ultra-short connector body, and the connector body comprises two movable first assembly element and second assembly element connected with each other to reduce the space occupied by the optical connector. In addition, because the connector body comprises two movable first assembly element and second assembly element, in one embodiment, the second assembly element is used to buckle with a housing, and the latching relationship between the second assembly element and the connector can be released by pushing the first assembly element to achieve the unlocking effect.

The present invention provides an optical connector with an ultra-short connector body. There is no extending structure on the left and right sides of the connector body beyond the peripheral boundary of the receptacle, so that adjacent optical connectors can be arranged more closely. There is also no additional structure on the upper and lower sides of the connector body beyond the peripheral surface of the receptacle, so that optical connectors can be stacked on each other through the receptacle, thereby increasing the usage density of optical connectors.

In one embodiment, the present invention provides an optical connector, comprising: a terminal portion; and a connector body, connected to the terminal portion, and having a buckle structure and an unbuckle structure, the buckle structure latched with a receptacle, and the unbuckle structure released the buckle structure from the receptacle, wherein the connector body comprises: a first assembly element, connected to the terminal portion, a first side of the first assembly element having a first channel, and a second side of the first assembly element having a first coupling element; and a second assembly element, connected to the first assembly element, a first side of the second assembly element having a second channel connected to the first channel, and a second side of the second assembly element having a second coupling element, which is movably connected to the first coupling element.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
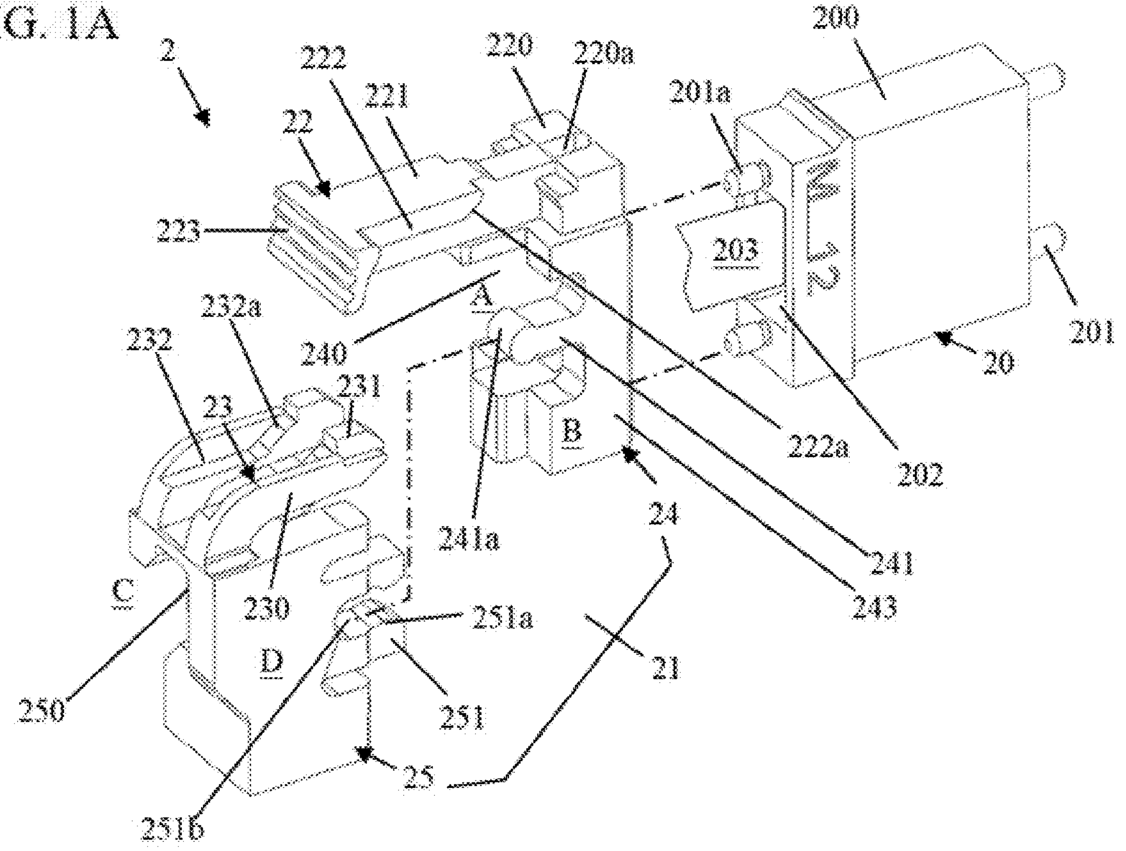
FIG. 1A is an exploded perspective diagram of an embodiment of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector to aid it of skilled in the art in practicing this invention. These embodiments are merely exemplary embodiments and in no way to be considered to limit the scope of the invention in any manner.

Figure 1B:
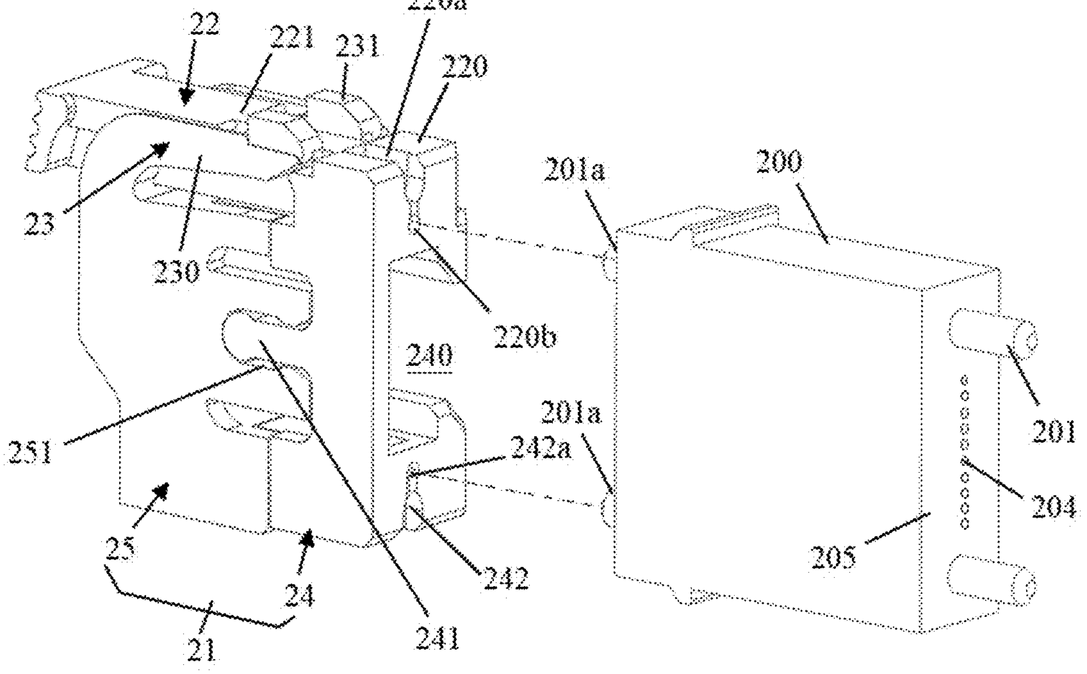
FIG. 1B is a three-dimensional exploded schematic diagram from another perspective of an embodiment of the optical connector in the present invention.

Please refer to FIGS. 1A and 1B, which are exploded perspective diagram of an embodiment of the optical connector in the present invention. In this embodiment, the optical connector 2 comprises a terminal portion 20 and a connector body 21. In this embodiment, the terminal portion 20 has a terminal housing 200 and a pair of positioning pins 201. The terminal housing 200 has an opening 202 for allowing the signal wire 203 to pass through. The signal end portion 204 of the signal wire 203 is located on the end surface 205 of the terminal portion 20. The positioning pins 201 penetrate the entire terminal housing 200 and protrude on both sides of the terminal housing 200 respectively. The protruding parts are used for positioning when connecting with other elements. This is a conventional technology and would not be described in detail herein.

The connector body 21 is connected to the terminal portion 20. In this embodiment, the connector body 21 has a first assembly element 24 and a second assembly element 25. The first assembly element 24 is combined and connected with the terminal portion 20. The first side A of the first assembly element 24 further has a first channel 240, and the second side B of the first assembly element 24 has a first coupling element 241. An unbuckle structure 22 is disposed above the first assembly element 24. In this embodiment, the unbuckle structure 22 and the first assembly element 24 are an integrally formed. The unbuckle structure 22 has a supporting base 220 and a first cantilever 221. The supporting base 220 is connected to the top surface of the first assembly element 24. The first cantilever 221 is connected to the supporting base 220. In this embodiment, the supporting base 220 has a slot 220*a* corresponding to the terminal portion 20, and a groove 242 opposite to the slot 220*a* is formed at another end of the first assembly element 24. The slot 220*a* and groove 242 are respectively used to accommodate a protruded latching end 201*a* on a side of the terminal portion 20, so that the first assembly element 24 can be coupled with the terminal portion 20. It should be noted that the slot 220*a* and the groove 242 further have shrink holes 220*b* and 242*a*, the diameter of which is smaller than the diameter of the latching end 201*a*, to ensure that the terminal portion 20 would not be separated from the connector body 21 due to the pulling force.

The second assembly element 25 is combined with the first assembly element 24. The first side C of the second assembly element 25 has a second channel 250 that is connected with the first channel 240. The second side D of the second assembly element 25 has a second coupling element 251, which is movably engaged with the first coupling element 241. In this embodiment, the first coupling element 241 further has a first curving surface 241*a*, and the second coupling element 251 has a coupling groove 251*a*, which has a second curving surface groove 251*b* movably coupled with the first curving surface 241*a*. When the first coupling element 241 and the second coupling element 251 are combined with each other, there is a space between the first coupling element 241 and the second coupling element 251, so that a movable space is maintained between the first coupling element 241 and the second coupling element 251. After the first assembly element 24 and the second assembly element 25 are combined, they are movable in each axial direction, thereby ensuring that the optical connector 2 moves with multiple degrees of freedom to reduce optical alignment errors between the optical connector 2 and the terminals of the receptacle, thereby reducing optical signal loss.

A buckle structure 23 is disposed on the second assembly element 25. In this embodiment, the second assembly element 25 and the buckle structure 23 are an integrally formed. The buckle structure 23 has a second cantilever 230, one end of which is connected to the top surface of the second assembly element 25, and a buckle element 231 on the other end of second cantilever 230 engages with the receptacle (not shown). The first cantilever 221 is leaned against the second cantilever 230 through a force, causing the second cantilever 230 to deflect, thereby releasing the latching relationship between the buckle element 231 and the receptacle. The detailed operation method is described in detail below.

In this embodiment, the buckle structures 23 are arranged in pairs on both sides of the top surface of the second assembly element 25, and the first cantilever 221 extends between the pairs of buckle structures 23. In this embodiment, the first cantilever 221 has protrusions 222 on both sides, respectively corresponding to the second cantilever 230 of each buckle structure 23. One end surface of the protrusions 222 has a first inclined surface 222*a*. Each second cantilever 230 has a recessed portion 232 corresponding to the protrusion 222, and the recessed portion 232 has a second inclined surface 232*a* corresponding to the first inclined surface 222. When the first cantilever 221 is forced, the first cantilever 221 is bent to push the first inclined surface 222 against the second inclined surface 232, thereby causing the second cantilever 230 to bend. It should be noted that the aforementioned embodiment is that the unbuckle structure 22 is disposed on the first assembly element 24 and the buckling structure 23 is disposed on the second assembly element 25, but the configuration is not limited herein. The user may also set the unbuckle structure 22 on the second assembly element 25, and set the buckle structure 23 on the first assembly element 24.

Figure 2:
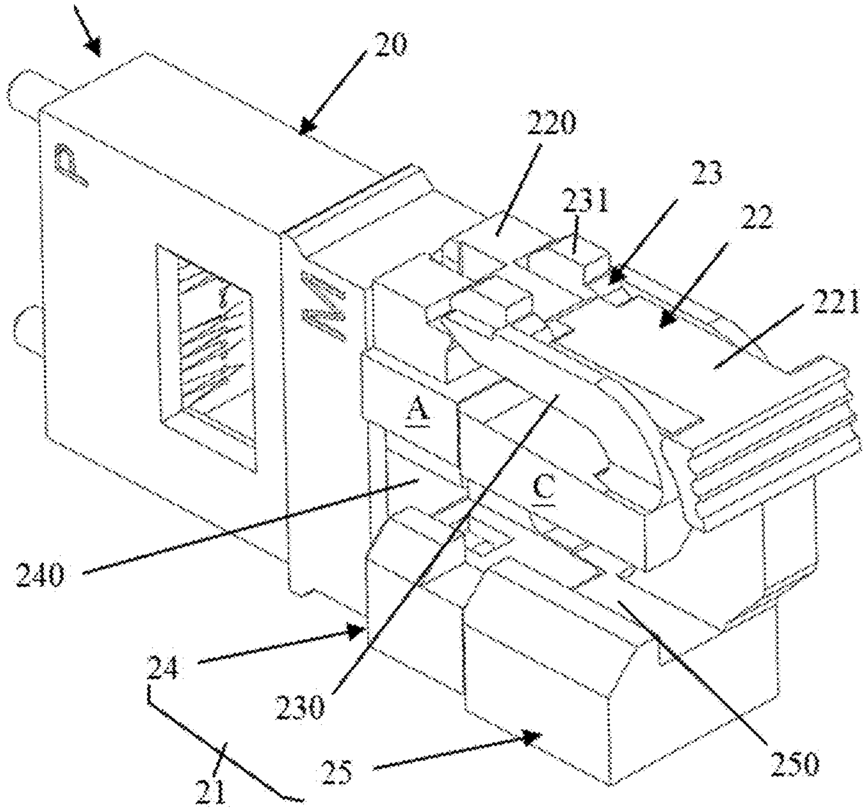
FIG. 2 is a schematic assembly diagram of an embodiment of the optical connector in the present invention.

Please refer to FIG. 2, which is a schematic assembly diagram of the optical connector in the present invention. In FIG. 2, since the first channel 240 and the second channel 250 are connected, a channel structure is formed on one side of the connector body 21 (located on the first sides A and C of the first assembly element 24 and the second assembly element 25, respectively). The communication wire can be directly inserted into the connector body 21 from the opening of the first channel 240 and the second channel 250, or taken away from the connector body 21, which increases the convenience of installing the communication wire.

Figure 3A:
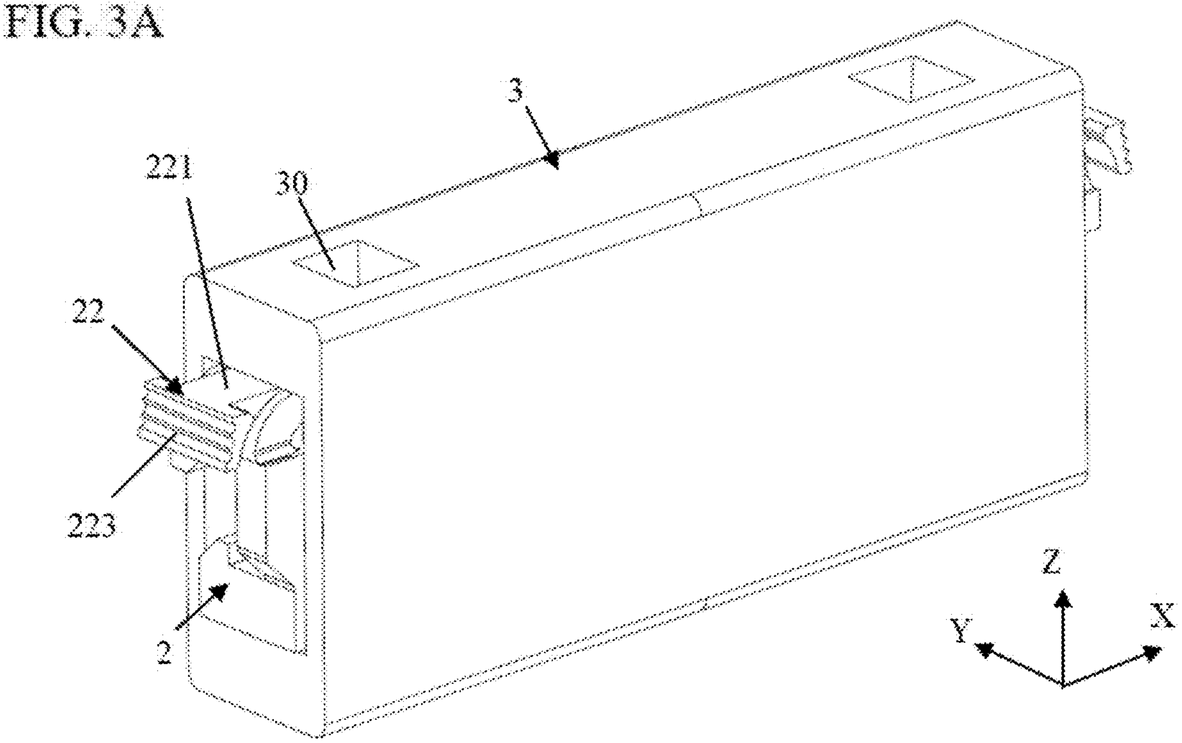
FIG. 3A is a schematic three-dimensional diagram of the optical connector inserted into the receptacle in the present invention.
Figure 3B:
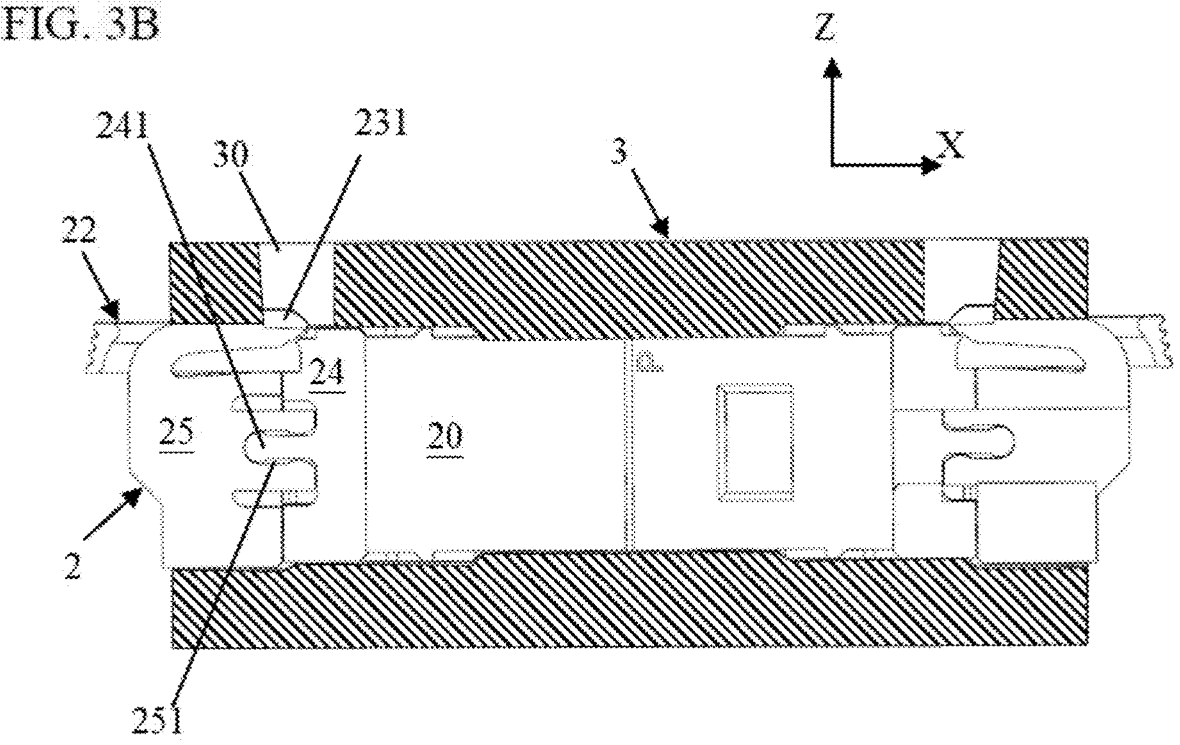
FIG. 3B is a partial cross-sectional diagram of the optical connector inserted into the receptacle in the present invention.
Figure 3C:
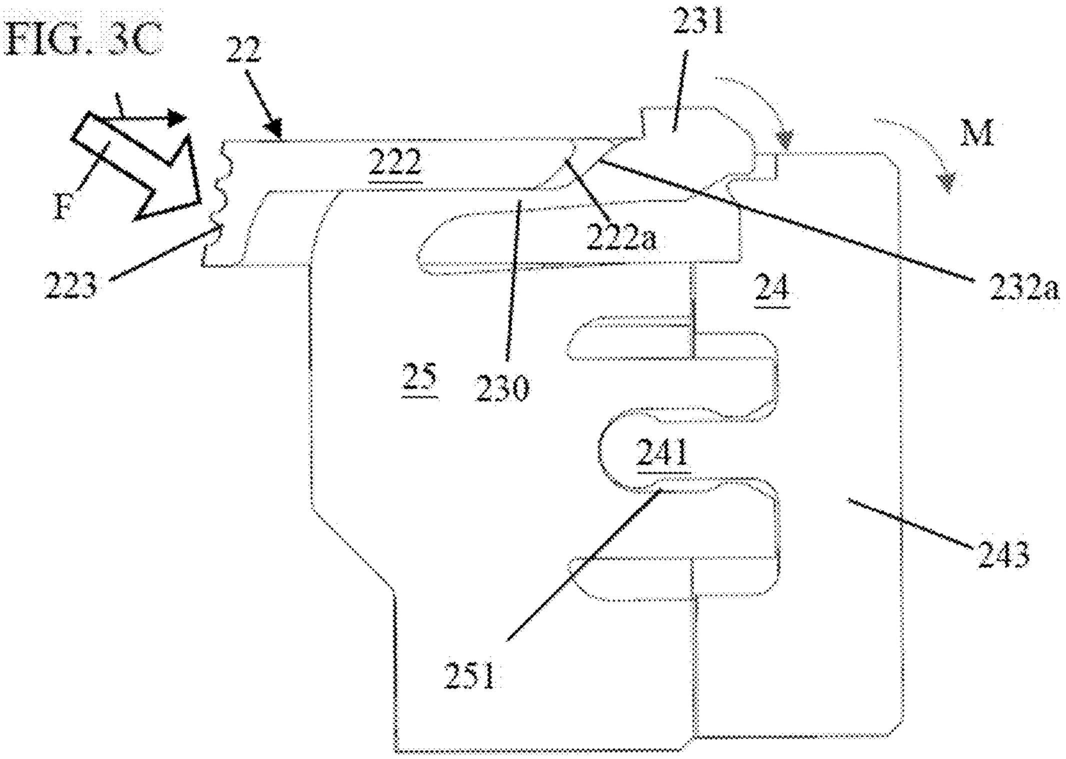
FIG. 3C is a schematic diagram of operating optical connector in the present invention.

Please refer to FIGS. 3A to 3C, FIG. 3A is a schematic three-dimensional diagram of the optical connector inserted into the receptacle, FIG. 3B is a partial cross-sectional diagram of the optical connector inserted into the receptacle, and FIG. 3C is a schematic diagram of operating optical connector. When the optical connector 2 is inserted into the receptacle 3, it can be seen that the body of the optical connector 2 does not have any protruding structure in the Z-axis and Y-axis directions. This allows the connector housing 3 to be arranged in the up and down Z-axis direction and the left and right Y-axis direction to increase the density of the optical connector 2. As shown in FIG. 3B, when the optical connector 2 is inserted into the receptacle 3, the buckle element 231 on the optical connector 2 would be embedded into the corresponding buckle through hole 30 of the receptacle 3, so that the optical connector 2 can be fixed in receptacle 3.

When the user wants to pull out the optical connector 2 from the receptacle 3, as shown in FIG. 3C, after the user presses the force-bearing surface 223 of the first cantilever 221 with the force F, the horizontal component force F1 of the force F pushes against the force-bearing surface 223, so that the first cantilever 221 delivers the horizontal component force F1 to the location where the first assembly element 24 and the first cantilever 221 is connected. Since the first assembly element 24 has been inserted into the receptacle 3, the first assembly element 24 cannot be moved relative to the receptacle 3. In addition, the first cantilever 221 is connected to an end portion of the first assembly element 24, and there is a movable space between the first coupling portion 241 and the second coupling portion 251 to allow the first assembly element 24 to move. Therefore, the horizontal component force F1 generates a moment M on the first assembly element 24, causing the element body 243 of the first assembly element 24 to flexibly bend in the clockwise direction, thereby causing the first inclined surface 222*a* of the protrusion 222 to be leaned against the second inclined surface 232*a* and delivering the horizontal component force F1 to the second cantilever 230, also causing the second cantilever 230 to be bent in the clockwise direction, thereby causing the buckle element 231 to move downward to be separated from the buckle through hole 30 when the second cantilever 230 is bent in the clockwise direction.

In summary, the present invention provides an optical connector, which has an ultra-short connector body, and the connector body comprises two movable first assembly element and second assembly element connected with each other to reduce the space occupied by the optical connector. In addition, because the connector body comprises two movable first assembly element and second assembly element, in one embodiment, the second assembly element is used to buckle with a housing, and the latching relationship between the second assembly element and the connector can be released by pushing the first assembly element to achieve unlocking effect. Moreover, there is no extending structure on the left and right sides of the connector body beyond the peripheral boundary of the receptacle, so that adjacent optical connectors can be arranged more closely. There is also no additional structure on the upper and lower sides of the connector body beyond the peripheral surface of the receptacle, so that optical connectors can be stacked on each other through the receptacle, thereby increasing the usage density of optical connectors.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:
a terminal portion; and
a connector body, connected to the terminal portion, and having a buckle structure and an unbuckle structure, the buckle structure latched with a receptacle, and the unbuckle structure released the buckle structure from the receptacle, wherein the connector body comprises:
a first assembly element, connected to the terminal portion, a first side of the first assembly element having a first channel, and a second side of the first assembly element having a first coupling element; and
a second assembly element, connected to the first assembly element, a first side of the second assembly element having a second channel connected to the first channel, and a second side of the second assembly element having a second coupling element, which is movably connected to the first coupling element,
wherein the first channel and the second channel are configured to facilitate installation of a communication wire in a direction transverse to a longitudinal direction of the communication wire.

2. The optical connector of claim 1, wherein the unbuckle structure is disposed on the first assembly element, and the buckle structure is disposed on the second assembly element; or the unbuckle structure is disposed on the second assembly element, and the buckle structure is disposed on the first assembly element.

3. The optical connector of claim 1, wherein the unbuckle structure has a supporting base and a first cantilever, the supporting base is connected to a top surface of the first assembly element, and the first cantilever is connected to the supporting base.

4. The optical connector of claim 3, wherein the buckle structure has a second cantilever, one end of the second cantilever is connected to a top surface of the second assembly element, and another end of the second cantilever has a buckle element, which is engaged with the receptacle, and the first cantilever is leaned against the second cantilever by a force, causing the second cantilever to be bent, thereby releasing the buckle element from the receptacle.

5. The optical connector of claim 4, wherein the buckle structures are arranged in pairs on both sides of the top surface of the second assembly element, and the first cantilever extends between the pairs of buckle structures.

6. The optical connector of claim 4, wherein the first cantilever has a first inclined surface, and the second cantilever has a second inclined surface corresponding to the first inclined surface; when the force acts on the first cantilever, the first cantilever is bent and causes the first inclined surface to push against the second inclined surface, thereby making the second cantilever to be bent.

7. The optical connector of claim 1, wherein the first coupling element has a first curving surface, and the second coupling element has a coupling groove, which has a second curving surface groove movably combined with the first curving surface.

* * * * *